Jan. 18, 1949. C. R. JOHNSON 2,459,748
COAGULATION OF SYNTHETIC RUBBER LATEX
Filed June 28, 1945
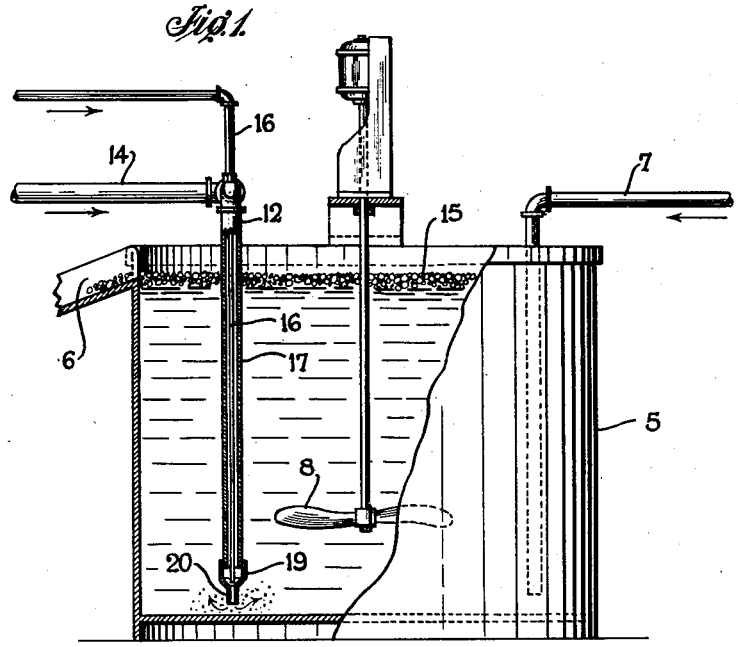
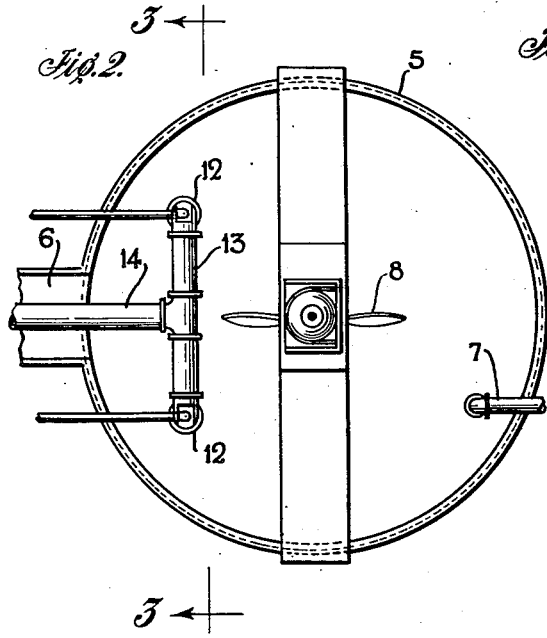
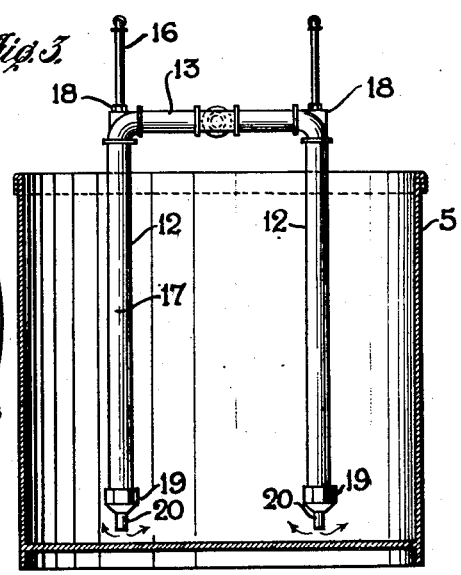
Inventor
CHARLES ROBERT JOHNSON
By Ely & Frye
Attorneys Patented Jan. 18, 1949

2,459,748

UNITED STATES PATENT OFFICE 2,459,748

COAGULATION OF SYNTHETIC RUBBER LATEX

Charles Robert Johnson, Akron, Ohio, assignor to The Firestone Tire & Rubber Company, Akron, Ohio, a corporation of Ohio Application June 28, 1945, Serial No. 602,123

3 Claims. (Cl. 260—86.5)

This invention relates to a method and an apparatus for coagulating dispersions, particularly those dispersions which are immediately coagulated upon contact with a liquid or fluid coagulating agent.

In the manufacture of synthetic rubber, for example, diolefins are polymerized, or copolymerized with olefins or ethylenic derivatives in aqueous emulsion to form elastomeric reaction products. The dienes so employed include butadiene, chloroprene, dimethyl butadiene, isoprene; the copolymers include in addition to a conjugated diene, an organic compound containing a single double bond bond carbon to carbon linkage such a styrene, chlorostyrene, an acrylic nitrile, isobutylene, methyl methacrylate or vinyl chloride. The polymeric substance so produced is suspended in minute particles or globules in an emulsion which will hereinafter be referred to as synthetic rubber latex.

The manner in which the dispersed rubber particles are coagulated is critical to the further processing of the elastomer. For example, coagulation processes in which large crumbs are formed tend to include in the center of the crumbs, uncoagulated regions of liquid latex. Upon the mechanical manipulation involved in pressing, drying and the like, the crumbs rupture and discharge the uncoagulated latex into the spaces between crumbs, resulting thereby in synthetic rubber polymer, difficult to process. Moreover, such incomplete coagulation causes equipment to become coated and clogged, as for example when wet crumb is run over a rotary filter of a type such as the Oliver filter. Rotary filters are highly adaptable to continuous processes and are among the most efficient apparatus available for washing and drying the synthetic rubber crumb coagulum. The efficiency of the rotary filter is impaired, however, when the polymer is too sticky to be wholly removed from the screen which covers the rotating drum. Any uncoagulated latex contained in the crumbs is likely to be discharged by them as they pass under the squeezing rolls of a rotary filter and be coagulated by the small amount of residual coagulant generally present, in the screen or the inner parts of the rotary filter, resulting in costly shutdowns for cleaning the equipment.

When appropriate concentrations and mixing methods are used, coagulum suitable for quick washing and water removal may be produced through the use of coagulating agents such as alcohols, acids, and metal salts, notably sodium chloride, barium chloride, and aluminum sulfate. It is observed that completeness of coagulation is dependent to a large extent on the manner in which the coagulant and the latex is mixed. As the reaction which produces coagulation is generally rapid and the tendency in this reaction is to form particles of coagulum which contain included latex not readily treated thereafter by the coagulant, said particles necessarily should be small. These particles, however, need not be smaller perhaps than approximately $\frac{1}{16}$ of an inch in their smallest dimension or they then become exceedingly difficult to separate from the mixture of coagulum and liquor resulting from the coagulation operation. Moreover, finer particles cause a synthetic rubber crumb cake such as is distributed on the screen of a rotary filter to become more resistant to the flow of water when subjected to vacuum applied at the inner side of the screen, and require, therefore, a thinner cake and a finer screen. Consequently, the washing and water removal capacity of a rotary filter is unnecessarily reduced when particle size is reduced below that necessary to obtain complete coagulation. However, until the present, no satisfactory apparatus adaptable to continuous operation has been developed, particularly with respect to aluminum sulfate coagulation, which yields particles of synthetic rubber coagulum easily processed on the rotary filter.

It is an object of this invention to produce synthetic rubber coagulum which is characterized by great freedom from included latex. It is also an object to control the particle size of the synthetic rubber coagulum. It is also an object to produce the said coagulum continuously in an apparatus simple in design and operation. Furthermore, it is an object to produce coagulum comprising particles which can be washed and partly dried on a rotary filter. Other objects will appear in the following description.

The objects indicated above and others are fulfilled by projecting into and below the surface of a body of liquid coagulant a stream of latex dispersed into a fine spray of droplets. The spray is produced by contact, within a suitable chamber, with a stream of high velocity air or gas by means of the apparatus illustrated in the accompanying drawings, in which:

Fig. 1 is a diagrammatic elevation view, partly in section, showing apparatus which may be used in practicing the invention;

Fig. 2 is a diagrammatic plan view of the apparatus illustrated in Fig. 1; and

Fig. 3 is a view, partly in section, of the apparatus of Fig. 1 taken on line 3—3 of Fig. 2.

Referring to Fig. 1 of the drawings, a tank 5 is provided for receiving materials which are essential to the coagulation of latices. The level of said materials is determined by an overflow means 6. Liquid coagulant flows into the coagulation tank continuously during the coagulation process through a duct 7. Continuous addition of coagulant is necessary in order to maintain the concentration necessary to effect coagulation, and it serves also to float out through the overflow means 6, the synthetic rubber coagulum. A motor driven agitator 8 provides vigorous circulation and mixing of the contents of the tank 5. The droplets of latex on being introduced into coagulant agitated in this manner are distended, deformed and subjected to rapid displacement of the fluid coagulant about them, thus hastening and making more effective the coagulation reaction.

The latex enters the tank 5 through a coagulator 12. Latex is supplied to the two identical coagulators 12 by a manifold 13. Duct 14 furnishes latex from any convenient latex storage not shown, to manifold 13. The function of the coagulator 12 is to conduct latex and air or gas to a region well below the surface 15 of the liquid coagulant through separate ducts and cause contact of the said latex and air or gas in a chamber near the end of these ducts before expelling the resultant mixture into the coagulant. The coagulator 12 includes an air duct or pipe 16 surrounded by a pipe 17 for transporting the latex. Pipe 17 is of such size that ample capacity is provided for the flow of latex between its inner wall and the concentric exterior wall of the smaller pipe 16. The top or entrance end 18 of pipe 17 is thoroughly sealed around the exterior of the pipe 16. The lower ends of both pipes terminate in a mixing chamber 19 typified by what is known in pipe-fitting parlance as a "swedge." The mixing chamber 19 is attached by fitting it tightly over the end of the larger pipe 17. The lower or discharge end of pipe 16 is adjusted to a position within the mixing chamber 19 so that the latex flows concentrically into the jet of air traversing downwardly the central portion of the said chamber. As it is desired to maintain a considerable portion of the velocity of the air jet, in the resultant stream comprising air and latex droplets, the discharge end of duct 16 is positioned so that it discharges directly into and through orifice 20 of the chamber 19. The orifice 20 is positioned in a region sufficiently near the bottom of tank 5 so that rapid flow therefrom is deflected in all directions and instantaneously distributed throughout a considerable volume of coagulant; however, sufficient space is maintained between the orifice 20 and the bottom of the tank 5 to permit unrestricted flow of the jet from the orifice.

In the successful practice of this invention one apparatus used includes a subsurface coagulator 12 approximately 36 inches long with the duct 17 being constructed of 2 inch pipe. The air duct is constructed of ½ inch pipe and extends into a 2 inch to ¾ inch "swedge," which forms a mixing chamber such as indicated by 19, to a point approximately ½ inch from the ¾ inch opening of the "swedge." Two unit coagulators 12, 12 are interconnected by a common latex supply means, namely, manifold 13 and operated simultaneously. The assembled apparatus containing two unit coagulators is suspended in the tank 5 of 400 gallons capacity so that the orifices 20, 20 are 8 or 12 inches above the bottom of the tank. The coagulant, a 3% $Al_2(SO_4)_3.18H_2O$ solution, is introduced through the pipe line 7. The flow of latex and coagulant into the coagulating tank 5 is so adjusted that a liquid mixture is produced containing approximately 0.5% solution of coagulant and approximately 7 or 8% by weight of suspended synthetic rubber crumb.

Approximately 1600 gallons per hour of latex are coagulated by maintaining an unvarying flow of latex into and through the latex supply manifold 13 by means of a proportioning pump (not shown). Any arrangement or equipment capable of maintaining a constant and uniform flow of latex may be substituted for the proportioning pump. An air pressure of approximately 10 pounds per square inch in the air ducts 16 provides the force which breaks the latex flowing through pipe 17 into the mixing chamber 19, into small globules. The resultant jet is rapidly mixed into the coagulant which is stirred very vigorously by the motor driven agitator 8 located centrally in the coagulation tank.

The overflow from the coagulating tank, i. e., the used coagulant and the coagulum, is preferably retained in a holding tank (not shown) to condition the coagulum for further processing. In connection with the 400 gallon coagulation tank referred to above, a 1500 gallon holding tank may be used to retain the coagulum a few minutes, so as to toughen the crumb, render it less tacky, and less likely to adhere to the screen of a rotary filter. The used coagulant and coagulum are stirred gently in the holding tank and then allowed to overflow onto the rotary filter. Here the coagulant is separated from the crumb and returned to storage tanks for reconcentrating. The used coagulant not retained for reconcentrating is allowed to flow into a sewer.

The above described apparatus has been used in large scale production for the coagulation of rubbery butadiene-styrene copolymer latices of 20 to 35% solids in conjunction with an Oliver rotary filter. To illustrate the flexibility of this apparatus, the capacity of the assembly just described may be doubled by merely suspending in the coagulation tank another two-unit subsurface coagulator of the type described above and doubling the rate of flow of the supply coagulant. Approximately 7000 pounds per hour of synthetic rubber (dry basis) is thus coagulated.

It will be understood that in the above described coagulator there is a strong tendency for the air jet from duct 16 as it enters the orifice 20 to form a vacuum in the mixing chamber 19. In one large scale adaptation of the invention, exploitation has been made of the vacuum forming principle by altering the proportions slightly in the design of coagulator 12. This apparatus is supplied with latex at a relatively low but constant pressure from an overhead open-type weir box. Through this arrangement, weir boxes are substituted for proportioning pumps with substantial reduction in equipment cost.

Coagulation has been carried out efficiently at concentrations, within the coagulation tank 5, as low as 0.2% Al₂(SO₄)₃.18H₂O. Higher concentrations are readily applicable but, as will be explained below, they may be uneconomical if in excess of the concentrations necessary for efficient coagulation by the apparatus which is the subject of this invention. The coagulant concentration in the supply coagulant which enters the coagulating tank 5 through duct 7 is necessarily higher than the coagulant concentration in the contents of tank 5 during the coagulation process. Concentration of the supply coagulant should be ample enough to cause the solution formed by the mixing of supply coagulant with water from the latex to produce coagulum efficiently under the conditions of this invention. For example, if a concentration of 0.5% Al₂(SO₄)₃.18H₂O is maintained in a coagulation slurry, a supply coagulant introduced thereinto of at least 3% is satisfactory.

The used coagulant overflows from the coagulation tank 5 at the concentration existing within the tank during coagulation. It is, therefore, the usual practice to return as much as possible of the used coagulant to the process to be used again. Most of the used coagulant is brought up to the concentration required of the supply coagulant and returned to the coagulation process. The remaining portion of the used coagulant is discarded to the sewer and, as a material balance on the process will reveal, is equal in volume to the water contained in the untreated latex minus the small amount of water in the rubber which enters the dryer. Since this volume represents unavoidable loss, it will be perceived that greatest economy of Al₂(SO₄)₃.18H₂O is obtained by discarding used coagulant at the lowest possible concentration. The lowest allowable concentration is determined by the efficiency of coagulation.

Other factors such as degree and type of agitation and shape and size of the coagulating tank influence the coagulation reaction. They are important in the use of this invention in obtaining the best results; however, they are not controlling and do not account for the unusually low coagulant concentrations applicable to the method herein described. Since the coagulant losses are approximately proportional to the concentrations used at the situs of the coagulation reaction, the utility of this invention and its advancement of the art of coagulation are well demonstrated by the utilization of the low coagulant concentrations herein referred to.

The great utility of this invention has been also well demonstrated by the increase in capacity of the rotary filter, attributable only to the improved character of the coagulum so derived. In fact, this new subsurface coagulator used in combination with a rotary filter and an air drying conveyor type oven constitutes at the present the most rapid and satisfactory commercial process for the conversion of latex into dry polymer. Apparatus of the combination described above is by no means limited to rubbery butadiene-styrene copolymer latices or to latices of particular solids content. It is used with equal success with butadiene-acrylonitrile copolymers, polybutadiene, and isoprene type polymers and copolymers. The principle of coagulation herein described and the apparatus for performing the same is applicable to the coagulation of any synthetic or natural rubber latex or any other aqueous dispersion containing a plastic material coagulable in a liquid. The coagulant may be a liquid such as an alcohol, or a liquid containing a salt such as barium chloride solution, or an acid or a solution containing an acid.

This invention is characterized also by economical consumption of the coagulant chemicals. Solutions of comparatively lower concentrations may be utilized on account of the increased area presented by the latex when dispersed into globules of the fineness produced by the apparatus herein described. This invention results in extremely efficient mixing from the combined effect of expelling a jet of air and latex from the coagulator toward the bottom of the tank, said jet being then deflected in all directions, and the vigorous action of a motor driven agitator.

Various theoretical considerations are applicable in the designing of the apparatus exemplified by the coagulator 12. It will be found, however, that any design roughly approximating that shown is capable of great flexibility in utilizing various combinations of latex and air pressures. Capacities may be approximated conveniently with ordinary formulas known to the field of hydraulics. Optimum behavior of any particular design may be quickly obtained by experimentation after the apparatus is set up and the materials are at hand for proceeding with the coagulation process. It is to be noted also that although the drawings show two units of the coagulator 12, many units may be attached to a common manifold and operated simultaneously.

It will be understood that modification may be resorted to and changes made in details and proportions obvious to those skilled in the art without departing from the spirit and scope of this invention as defined in appended claims.

What is claimed is:

1. A continuous method of coagulating a rubbery butadiene-styrene copolymer latex, which comprises mixing the latex with a continuous high velocity stream of air to produce a mixture of latex droplets and air, introducing the latex-air mixture into and beneath the surface of a body of liquid coagulant for the latex consisting essentially of a water solution containing 0.2% to 3% Al₂(SO₄)₃.18H₂O, separately agitating the body of coagulant as the latex-air mixture is introduced thereinto in order to prevent substantial agglomeration of freshly coagulated latex droplets and to produce copolymer crumbs in readily filterable condition, continuously removing a mixture of the crumbs and aqueous liquid from a region near the top of said body of coagulant, and separating crumbs from said aqueous liquid.

2. A continuous method of coagulating a rubbery butadiene-styrene copolymer latex, which comprises mixing the latex with a continuous high velocity stream of air to produce a mixture of latex droplets and air, introducing the latex-air mixture into and beneath the surface of a body of liquid coagulant for the latex, separately agitating the body of coagulant as the latex-air mixture is introduced thereinto in order to produce copolymer crumbs in readily filterable condition, continuously removing a mixture of the crumbs and aqueous liquid from a region near the top of said body of coagulant holding the crumb and liquid mixture for a few minutes to reduce the tackiness of the crumbs, and separating crumbs from the aqueous liquid.

3. A continuous method of coagulating an aqueous dispersion of a rubbery substance from the group consisting of a polymer of a conjugated diene and copolymer of a conjugated diene and an organic compound containing a single double bond carbon to carbon linkage, which comprises mixing the dispersion with a high velocity stream of air to produce a mixture of droplets of dispersion and air, introducing the dispersion-air mixture into and beneath the surface of a body of liquid coagulant for the dispersion, separately agitating the body of coagulant as the dispersion-air mixture is introduced thereinto in order to produce crumbs of the rubbery substance in readily filterable condition, continuously removing a mixture of the crumbs and aqueous liquid from a region near the top of said body of coagulant, and separating crumbs from the aqueous liquid.

CHARLES ROBERT JOHNSON.

REFERENCES CITED

The following references are of record in the file of this patent:

UNITED STATES PATENTS

| Number | Name | Date |
|---|---|---|
| 737,003 | McKnight | Aug. 25, 1903 |
| 918,567 | Marek | Apr. 20, 1909 |
| 1,749,625 | Becker | Mar. 4, 1930 |
| 2,426,127 | Thomas | Aug. 19, 1947 |